United States Patent

[11] 3,602,460

| [72] | Inventors | Donald Charles Whittley<br>Port Credit, Ontario;<br>John Albert Conway, Milton, Ontario, both of, Canada |
|---|---|---|
| [21] | Appl. No. | 832,326 |
| [22] | Filed | June 11, 1969 |
| [45] | Patented | Aug. 31, 1971 |
| [73] | Assignee | The De Havilland Aircraft of Canada Limited |

[54] AIRCRAFT HAVING VERTICAL AND FORWARD MOTION AERODYNAMICS
3 Claims, 12 Drawing Figs.

[52] U.S. Cl. .................................................... 244/12
[51] Int. Cl. .................................................. B64c 29/00
[50] Field of Search .......................................... 244/12, 23

[56] References Cited
UNITED STATES PATENTS

| 3,207,245 | 9/1965 | Weiland .................. | 244/23 |
| 3,387,456 | 6/1968 | Feder et al. .............. | 244/23 |
| 3,429,527 | 2/1969 | Whittley .................. | 244/12 |

Primary Examiner—Milton Buchler
Assistant Examiner—Steven W. Weinrieb
Attorney—Cavanagh & Norman ABSTRACT: The disclosure sets forth a winged aircraft having both vertical and forward direction aerodynamic capabilities which are both functional in the transition stage during landing and takeoff maneuvers.

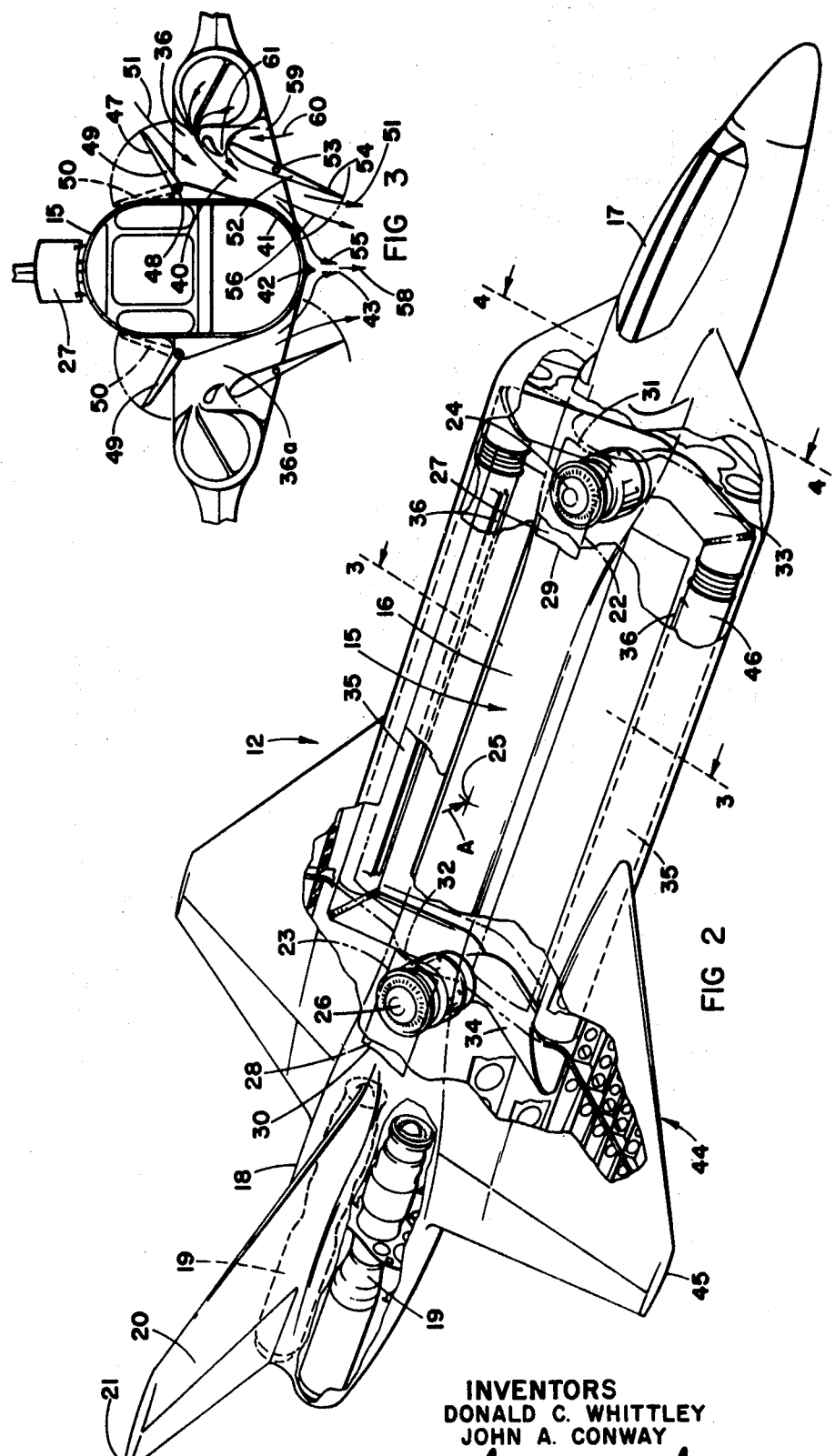

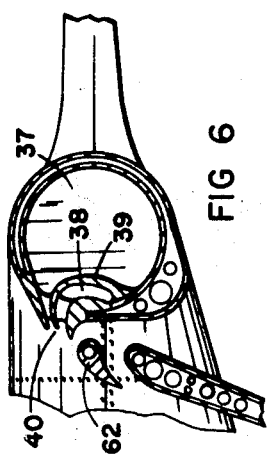
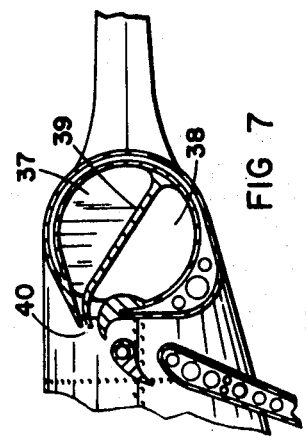
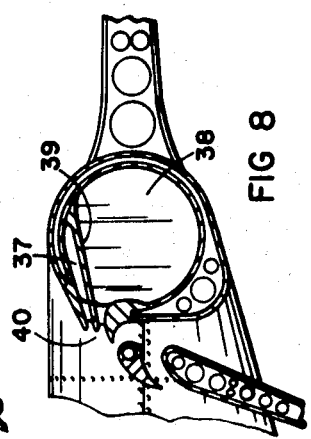
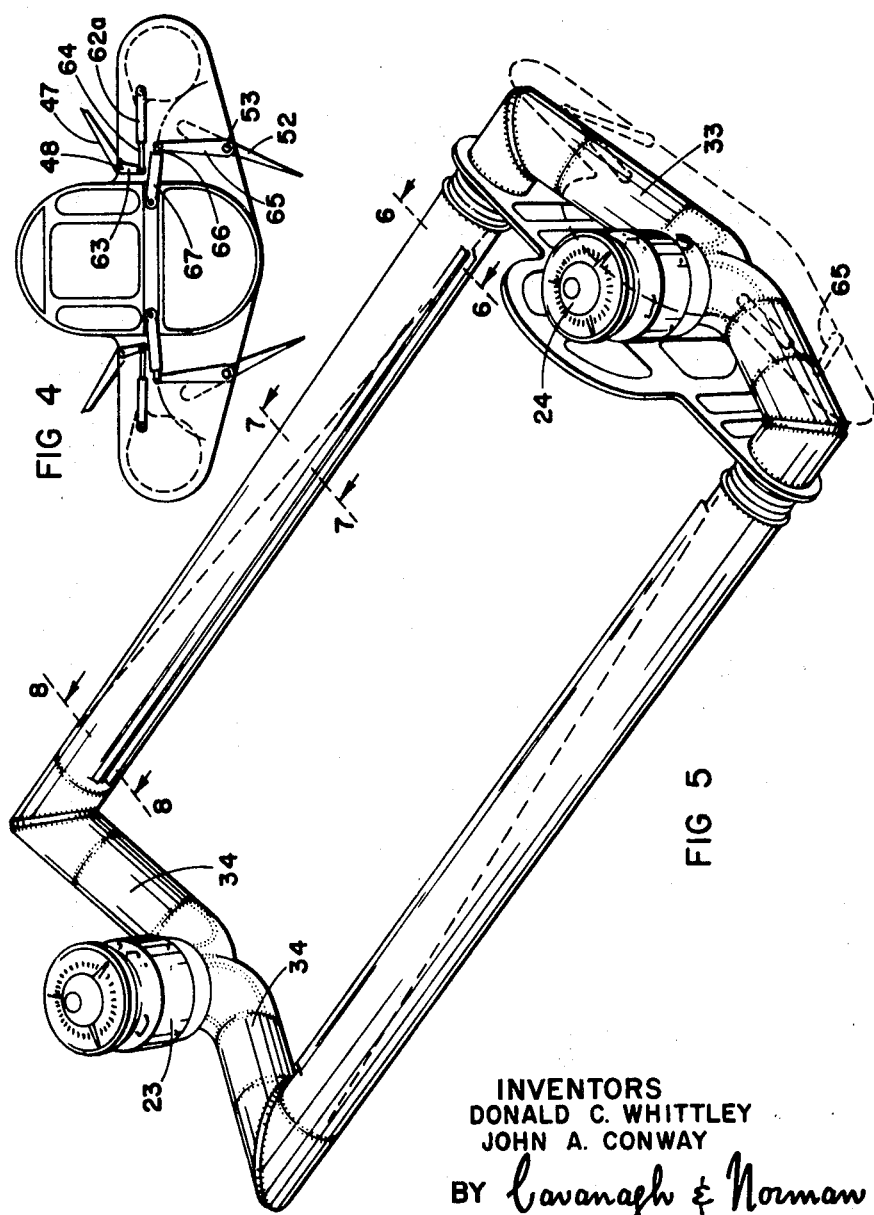
INVENTORS
DONALD C. WHITTLEY
JOHN A. CONWAY
BY Cavanagh & Norman

AIRCRAFT HAVING VERTICAL AND FORWARD MOTION AERODYNAMICS

This invention relates to a high forward speed aircraft especially of supersonic capability and moveable vertically particularly in takeoff and landing maneuvers by systems of combined aerodynamic character.

All prior methods for achieving vertical motion of a high forward speed aircraft have utilized a brute force nonaerodynamic type of vertical thrust system for vertical takeoff and landing. Such vertical thrust systems are in no way related to the aerodynamic characteristics of the aircraft fuselage and wing contours. In such aircraft the transition from vertical motion to forward aerodynamic flight is accompanied by problems of turbulence and instability which must be compensated for by outboard airblast controls especially when the aircraft encounters wind gusts or crosswinds.

Over the past decade many attempts have been made to achieve a vertical short takeoff and landing aircraft adapted for fighter applications especially from helicopter base carrier ships. That design or prior art closest to operational use in the year 1969 is of a form providing two pair of longitudinally spaced-apart blast nozzles projecting from both sides of the fuselage of the aircraft and adapted to be directed from a full rearward position to a full downward position. The noise, heat and ground blast effects are severe. The engine and inboard ducting limit the usefulness of such aircraft to single purpose specialized service only.

It is the main object of the invention to provide a high forward speed aircraft having a vertical takeoff capability in which the vertical takeoff system is aerodynamically correlated with the wing lift system during takeoff and landing maneuvers thus to enable a degree of aerodynamic control to assist stability during transition from vertical motion to forward flight speed or the reverse and to reduce turbulence during such transition stage.

It is a further object of the invention to provide fuselage inboard thrust gas generators in combination with fuselage outboard gas projection slot devices adapted to project thrust gases inwardly toward under surfaces of the fuselage with substantial quantities of secondary air indrafted at least from upper surfaces of wing contours and in which said slot structure embodies an enclosure therefore defining a partial wing element contribution to the location of center of lift.

It is another object of the invention to provide an aircraft as set forth herein having a wing structure of predetermined (and preferably of delta) configuration and embodying a forward extension thereof to extend about forward portions at least of said slot structure to advance the center of lift to the point of coincidence with the centers of gravity and vertical thrust.

It is a further object of the invention to provide an aircraft as herein set forth in which the vertical thrust engines communicate with the vertical thrust slot structures in mutual crossover duct relationship whereby said slot structures are only operational simultaneously by one or more of said engines.

It is a still further object of the invention to provide an aircraft as set forth herein in which the ingestion of secondary air in the manner set forth hereinafter maintains both the effective angle of attack constant and a condition of controlled airflow over aerodynamic surfaces during wind gusts or the like and which would otherwise effect the transition stage of takeoff and landing control.

With the foregoing and other objects in view the following invention concerns a high forward speed vertically moveable aircraft having coincident centers of lift, gravity and vertical thrust and comprising: a fuselage structure; means for generating horizontal and vertical thrust gases; a gas directing slot structure outboard of said fuselage extending longitudinally on each side thereof and directing thrust gases inwardly toward undersurfaces of the fuselage to join longitudinally therebeneath in a downwardly directed thrust stream having a coincident center of vertical thrust; a wing structure of predetermined configuration; and a forward extension of said wing structure extending about said slot structure and advancing the center of lift of the wing to coincide with the center of gravity and of vertical thrust.

Other objects of the invention will be appreciated by a study of the following specification taken in conjunction with the accompanying drawings.

In the drawings:

FIG. 2 is a transparent perspective of the aircraft of the invention revealing major components.

FIG. 3 is a section on the line 3—3 of FIG. 2.

FIG. 4 is a section on line 4—4 revealing control linkages for vertical thrust doors.

FIG. 5 is a detail perspective of vertical thrust engines and ducting of FIG. 2.

FIG. 6 is a sectional detail on line 6—6 of FIG. 5.

FIG. 7 is a sectional detail on line 7—7 of FIG. 5.

FIG. 8 is a sectional detail on line 8—8 of FIG. 5.

Figure 1:
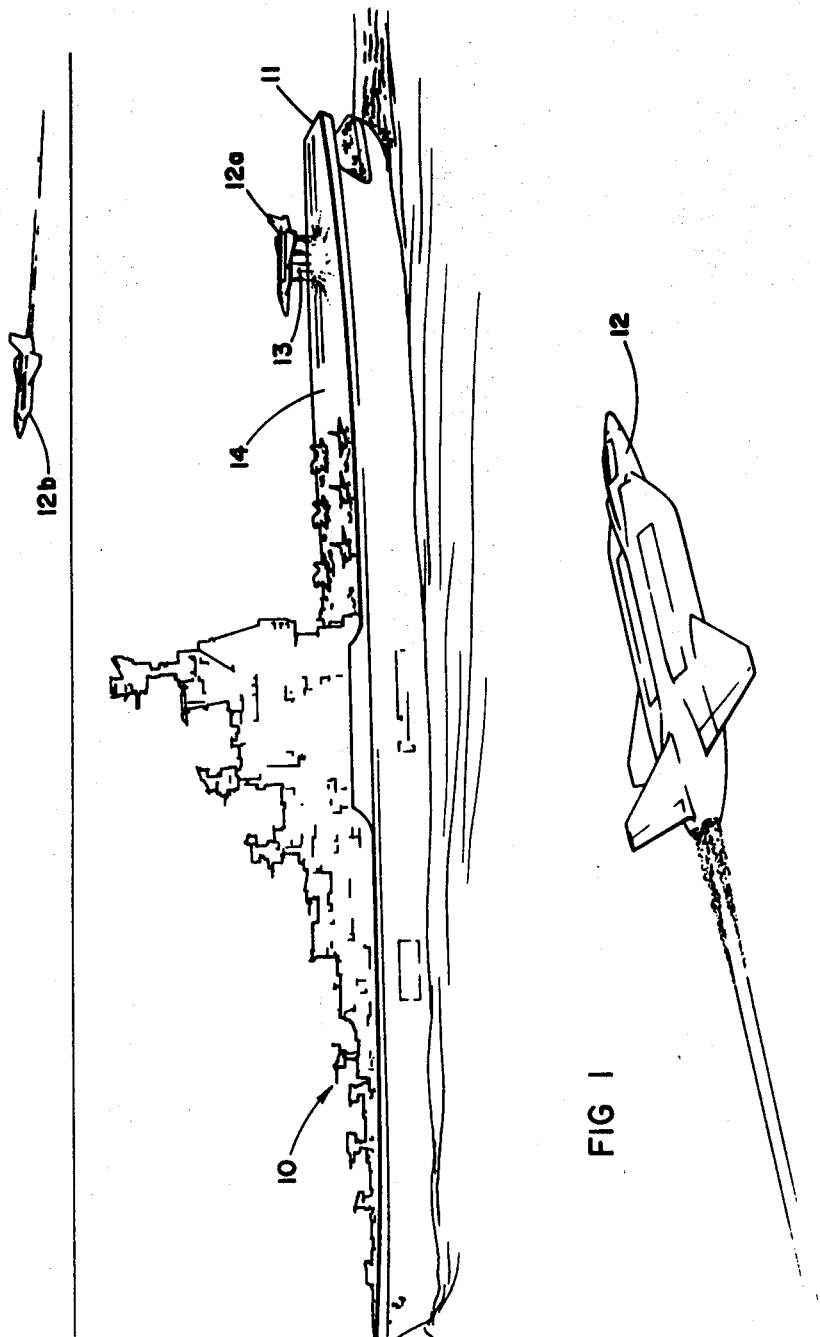
FIG. 1 is a perspective of aircraft of the invention serving a small gunboat class of carrier otherwise useful for helicopters only.

Referring to the drawings a helicopter-carrier-type gunboat 10 having a very small takeoff and landing deck 11 may be required to maneuver in such manner that an approaching high-speed aircraft 12 of the invention may have to prepare for landing as at 12a in a final stage of vertical descent under wind-gusting conditions or conditions of wind direction not normally considered as suitable for landing. Likewise the aircraft on takeoff may have to achieve a ship clearance height under vertical thrust control while developing very little forward speed and then pass through a transition stage before achieving a forward speed of flight as indicated at 12b under which the aerodynamic characteristics of the wings support the aircraft. Having regard to heavy armament and fuel loadings desired to be concentrated if possible in the region of the center of gravity of the aircraft, the rigorous requirements to be met in both the design and operational aspects of landing on and taking off from such a small field target under the most difficult conditions has been a challenge met only in part by direct methods of applying a concentrated vertical gas blast of high intensity, temperature, turbulence and noise. As indicated in FIG. 1 the aircraft 12 of the invention provides a longitudinally extending downwardly directed gas stream 13 of much less noise and turbulence than a direct gas blast and avoids conditions of jet impingement and fountain effects on the landing surface 14. These characteristics may be accomplished by the detailed arrangement of aircraft structure disclosed in the following figures by way of illustration of preferred structure.

In FIGS. 2 to 8 inclusive aircraft 12 having a coincidence of center of gravity, center of lift and center of vertical thrust indicated by arrow A comprises a fuselage structure 15 in the form of a free central cargo fuel or armament space 16 between a forward pilot cabin or control section 17 and a rearward tail or driving section 18 containing forward thrust engines 19 and having an upright stabilizer 20 with a rudder element 21 thereon.

Lightweight lift engines of a thrust weight ratio of the order of greater than 20 to 1 are shown at 22 and 23 located inboard of the fuselage 15. Engine 22 is located with its intake fitting 24 entirely within the fuselage at a predetermined distance forward of the center of gravity at 25 indicated by arrow A. Another inboard thrust gas-generating engine 23 is located rearwardly of the gravity center 25 a distance maintaining the location of such center and again is vertically arranged to dispose its inlet fitting 26 uppermost but entirely within the fuselage. Intake doors 27 and 28 may be hinged along the rearward edge 29 and 30 to raise the forward edges 31, 32 for the induction of upper exterior air. The outlets of these vertically disposed engines communicate by lateral ducting 33, 34 to large longitudinally extending dual-plenum ducts 35 exterior of the fuselage and parallel thereto and embodying the inwardly directed longitudinally extending slot structure 36.

The dual-plenum duct structures 35 are evidenced in more detail in FIGS. 5 to 8 and embody upper and lower plenums 37, 38 the upper of which communicates by manifold 33 to engine 23 and the lower of which communicates by manifold 34 to engine 22. It will be observed that the slot structures 36 are in reality defined by dual slots formed by manifold-supporting wall 39 extending into the slot opening 40. In this way each of the engines will project gases from gas-directing slot structures 36 on both sides of the fuselage downwardly through a gap 36a toward the fuselage in the direction of arrow 40 (FIG. 3). The projecting gas streams 40 on each side of fuselage 15 will attach to the curved undersurface 41 of the fuselage and join downwardly past keel 42 into a vertically and downwardly directed thrust stream 43 extending below the fuselage for a longitudinal distance corresponding substantially to the length of the slot structures 36. Such slot structures are so located longitudinally with respect to the center of gravity A as to render the longitudinally center of vertical thrust coincident therewith.

Wing structure 44 is of predetermined configuration of substantially delta planform in the monowing element 45 presenting a forward extension or portion 46 of the wing configuration housing said slot structure 36 and manifolds 35 to advance the center of lift of the wings to a point of coincidence with the center of gravity at 25 designated by arrow A. An upper surface valve element 47 shown in the form of a door hinged as at 48 and conforming in its upper surface wing contours adapted to be opened to the position indicated at 50 in chain lines to permit upper surface secondary air to be induced by the path 51 by the slot structure thrust stream 40. Likewise the lower surface valve elements 52 hinged as at 53 are rotatable from a fully closed position at which their undersurfaces 54 define the lower surface of the wing contour to a full-open position permitting escape of the augmented thrust gases 53 by arrows 55, 56 and 57 to join with the corresponding augmented thrust gases on the other underside of the fuselage to form a longitudinally extending downwardly directing thrust stream 58. An outboard intake opening 59 will also be provided upon opening of the undersurface valve element to permit communication of further secondary air by arrow 60 to the thrust stream 40 by way of gap 61. The coanda deflector 62 on the other side of gap 61 and located between valve door 52 and the thrust gas slot 40 provides a curved surface to which the thrust gases attach causing a thrust stream to be bent or redirected downwardly toward the undersurfaces of the fuselage through a free space within which secondary air is inducted or ingested from beyond the upper and lower airfoil surfaces.

The intake valve element 47 may be operated about its hinge or pivot 48 by actuating cylinder 62 articulating valve crank lever 63 by its piston arm 64. Similarly the exit valve or door 52 is swung on its hinge or pivot 53 by lever arm 65 actuated by piston arm 66 of actuating cylinder 67.

Figure 9:
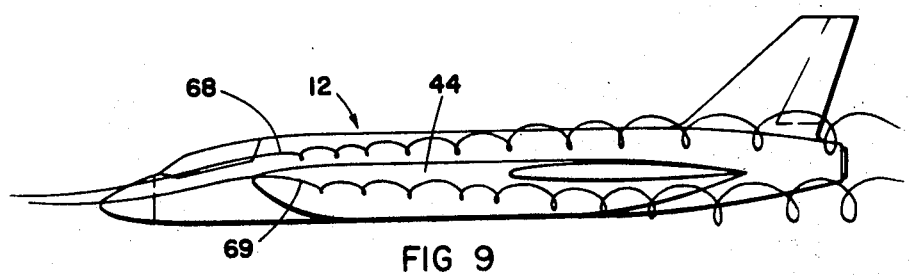
FIGS. 9 and 10 are side elevation and plan flow diagrams of a double-delta planform wing encountering a turbulence condition arising from an increasing and high angle of attack at low forward speed.
Figure 10:
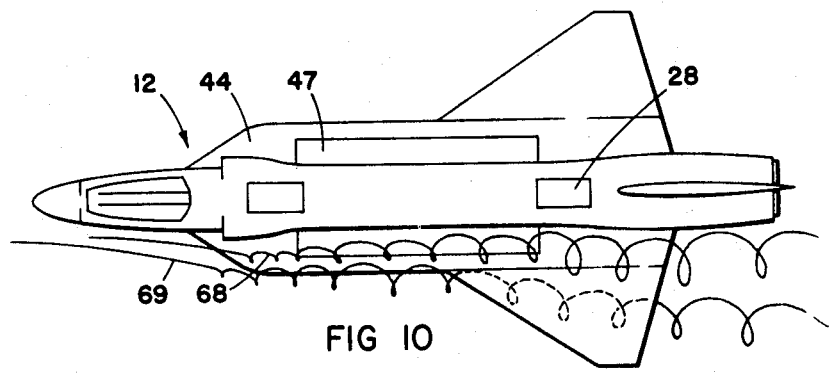

As indicated in FIGS. 9 and 10 an extended delta wing planform of wing structure 44 of the invention at transition speeds of less than about 60 miles per hour may cause turbulence vortices 68, 69 to be generated, especially if the aircraft is encountered by a severe wind gust whereby the effective high angle of attack is subjected to a high rate of increase.

Figure 11:
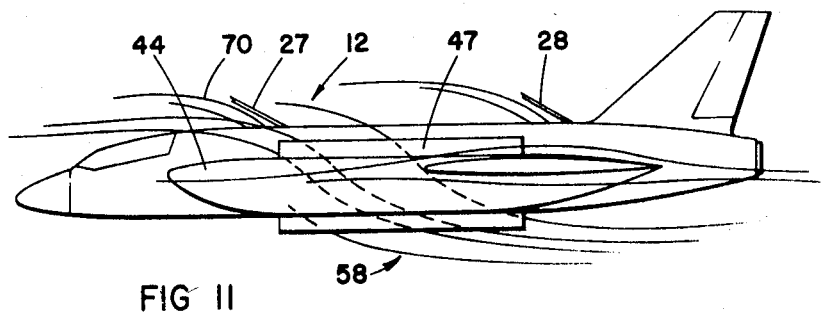
FIGS. 11 and 12 are similar plan and flow diagrams to those of FIGS. 9 and 10 but showing the effect of utilizing the form and location of vertical thrust devices of the invention in a manner reducing turbulence lines to laminar flow in the airstream.
Figure 12:
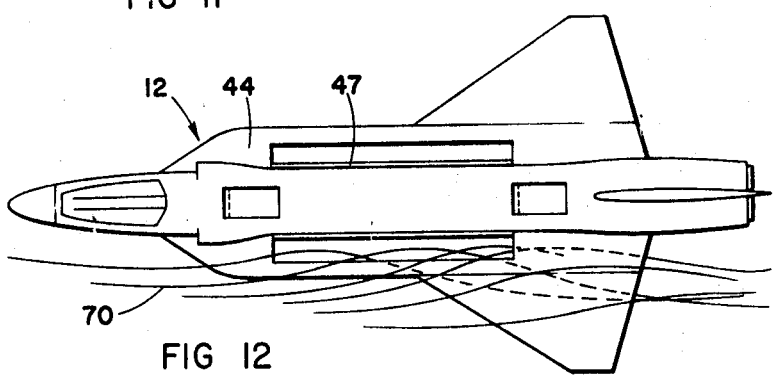

As indicated in FIG. 11 an aircraft 12 of the invention ingests upper surface air arriving by line 70 through the open intake valve members 47 and delivers same with the longitudinally extending thrust stream 58 in such manner as to obviate the deterioration of stability of the wing which might otherwise arise from the conditions illustrated in FIGS. 9 and 10.

The vertically moveable aircraft of the invention utilizes lightweight lift engines for vertical thrust in a manner providing a maximum of load-carrying space closest to the center of gravity, center of lift and center of vertical thrust. The engines being connected in mutual crossover duct relationship with the gas-directing slot structures 36 which extend longitudinally of the fuselage enable control to be maintained in the event of the failure of one engine. The mixing of cold secondary air with the hot thrust gases from the slot structures reduces velocities and temperatures and accordingly reduces hazards of airstrip erosion and noise.

The longitudinally extending downwardly directed thrust stream being located relative to both the longitudinal and lateral center of gravity of the aircraft permits a control of the aircraft undisturbed by the effects of vertical thrust. The longitudinal thrust stream spreads evenly along the airstrip or ground surface. Because this is the sole downwardly directed jet thrust stream, the possibility of fountain effects, in which the jets from multiple surfaces impinge upon the ground surface and spread toward one another and rise upward, are entirely avoided. The arrangement of vertical engines with upper surface air intake as shown provides for ingestion of secondary air from regions remote from the exhaust of hot gases. In addition the intake of upper surface air both in the region of the engines and at the intake valves may assist in the control of alleviation of unexpected turbulence arising during takeoff and landing under influence of vertical thrust.

It will be understood that the aircraft described herein is to be provided with small wing tip blast nozzles and fore and aft gas blast nozzles as may be required and adapted to be controlled by the pilot in accordance with prior art technique for correcting the attitude of the aircraft or assisting in stabilizing same in takeoff, landing and hovering.

We claim:

1. A high forward speed vertically moveable winged aircraft having coincident centers of lift, gravity and vertical thrust and comprising: a fuselage structure; with inboard engines for generating horizontal and vertical thrust gases; dust structure communicating vertical thrust gases outboard of said fuselage a gas-directing slot structure extending from said duct structure longitudinally outboard on each side of said fuselage and directing thrust gases inwardly toward undersurfaces of the fuselage to join longitudinally therebeneath in a downwardly directed thrust stream having a coincident center of vertical thrust; a wing structure of predetermined configuration about said slot structure and a forward extension on said wing structure extending about said slot structure and advancing both the slot structure and the center of lift of the wing to coincide with the center of gravity and vertical thrust, said forward extension and slot structure being aerodynamically compatible with said wing in a transition stage of flight during takeoff and during landing; and valve elements in the upper and lower surfaces of said wing adjacent said fuselage for the induction of secondary air through said upper surfaces of said wing and in the region of said slot structure therein and openable to induct turbulence generated by said forward wing extension during transition flight conditions between vertical thrust lift and aerodynamic lift.

2. The aircraft of claim 1 in which the inboard engines are located remote from the center of gravity of the aircraft a distance maintaining the location of the center of gravity.

3. The aircraft of claim 1 in which the said gas-directing slot structure is defined by a dual plenum in the form of a longitudinally slotted tube having a dividing wall extending through the slot thereof to divide the latter into two slots each in communication with separate and discrete longitudinally extending plenum portions of said tube; and a separate inboard engine serving each said plenum portions and connected thereto by separate duct structure.